United States Patent Office 3,496,141
Patented Feb. 17, 1970

3,496,141
METHOD OF REDUCING HYDROXYL GROUPS IN EPOXIDE RESINS
Eric Whichell Young, Saffron, Bryan Dobinson, Duxford, Bernard Peter Stark, Stapleford, and Richard John Martin, Linton, England, assignors to Ciba Limited, Basel, Switzerland, a company of Switzerland
No Drawing. Filed June 14, 1967, Ser. No. 645,867
Claims priority, application Great Britain, July 6, 1966, 30,401/66
Int. Cl. C08g *30/04*
U.S. Cl. 260—47          7 Claims

ABSTRACT OF THE DISCLOSURE

This invention relates to a process for reducing the hydroxyl group content of an epoxide resin which comprises reacting a hydroxyl group-containing epoxide resin with a compound of the formula $$R^1-(O)_m-C(R)(OR^2)(OR^3)$$

wherein R denotes hydrogen, or an alkyl, alkenyl, cycloalkyl, cycloalkenyl or aryl group, $R^1$, $R^2$ and $R^3$ each denote an alkyl or alkenyl group, at least one of $R^2$ and $R^3$ containing not more than five carbon atoms, and $m$ is zero or 1.

---

This invention relates to a process for reducing the hydroxyl group content of epoxide resins, to hardenable compositions containing resins so treated, and to the products obtained by curing such compositions.

It is well-known that epoxide resins, i.e. compounds containing on average more than one 1,2-epoxide group per molecule, when prepared by conventional means, generally contain hydroxyl groups, sometimes necessarily formed by the process giving rise to the epoxide resin and sometimes unavoidably formed by partial reaction of the epoxy groups in the resin molecules. For example, the preparation of an epoxide resin by the reaction of a dihydric phenol of formula HO·Z·OH with epichlorohydrin in an alkaline medium may be represented as follows:

$$HO \cdot Z \cdot OH + 2 ClCH_2CH(O)CH_2 \longrightarrow$$

$$ClCH_2CHOHCH_2O \cdot Z \cdot OCH_2CHOHCH_2Cl - 2HCl$$

$$\downarrow$$

$$CH_2(O)CHCH_2O \cdot Z \cdot OCH_2CH(O)CH_2$$

This diglycidyl ether may, however, react with a further molecule of the dihydric phenol thus:

$$CH_2(O)CHCH_2O \cdot Z \cdot OCH_2CH(O)CH_2 + HO \cdot Z \cdot OH \longrightarrow$$

$$HO \cdot Z \cdot O CH_2CHOHCH_2O \cdot Z \cdot OCH_2CH(O)CH$$

and the terminal phenolic group so produced may react with a further molecule of epichlorohydrin, and the product then undergo dehydrohalogenation as before. It will be seen that the final product may be represented by the average formula:

$$CH_2(O)CHCH_2(O \cdot Z \cdot OCH_2CHOHCH_2)_p O \cdot Z \cdot O \cdot CH_2CH(O)CH_2$$

where $p$ may not be zero, but may be, for example, within the range 0.5 to 2, in which case the product necessarily contains hydroxyl groups.

The hydroxyl content of commercially-available epoxide resins is often quite high. For example, the well-known epoxide resins prepared from bisphenol A (2,2-bis(p-hydroxyphenyl)propane) and epichlorohydrin usually contain, if liquid at room temperature, from about 0.3 to 1 gram-equivalent of hydroxyl groups per kg. or, if melting at about 40 to 60° C., about 1.15 to 2.3 gram-equivalent of hydroxyl groups per kg. The hydroxyl groups may, in fact, be present in chlorohydrin groups.

Epoxide resins are also produced by the reaction of acyclic or cyclic compounds containing two or more ethylenic bonds with an epoxidizing agent, generally an organic percarboxylic acid. Such resins ordinarily contain a proportion of hydroxyl groups arising from practically unavoidable solvolysis of the epoxide groups.

While in many cases the presence of hydroxyl groups in an epoxide resin is acceptable or sometimes even desirable, it is sometimes preferable to employ an epoxide resin which is substantially free from hydroxyl groups. It has been found, for example, that the maximum temperature attained under the normal conditions of hardening of an epoxide resin, which initially contained hydroxyl groups but which has been modified to render it substantially free from hydroxyl groups, with an amine curing agent is considerably less than that attained during the hardening under similar conditions of the unmodified resin, and less even than the maximum temperature attained during hardening under similar conditions of an unmodified hydroxyl group-containing resin of the same initial epoxide group content as the modified resin. Reduction in the maximum temperature attained is desirable so that the mixture undergoing cure should not attain a temperature so high that stresses occur within the cured product severe enough to cause cracks and possible damage to components encapsulated in the resin mixture. Further, compositions comprising epoxide resins which are substantially free from hydroxyl groups, and either a catalytic hardener or an unaccelerated polycarboxylic acid anhydride hardener, have longer potlives than otherwise similar compositions in which the epoxide resins contain hydroxyl groups.

It has been proposed to prepare hydroxyl group-free epoxide resins by fractional distillation under reduced pressure of the crude resin. This process is, however, inconvenient and requires relatively expensive high-vacuum equipment. Further, when applied to the reaction product of bisphenol A and epichlorohydrin, this process gives the substantially pure diglycidyl ether of bisphenol A, which undesirably is liable to crystallise on standing at room temperature. The reaction between this purified resin and an amine curing agent is strongly exothermic, because of the high density of cross-linking.

It has now been found that the hydroxyl group content of epoxide resins may be substantially reduced by reaction of the hydroxyl groups with certain acetals, ketals, or orthoesters.

The present invention accordingly provides a process for reducing the hydroxyl group content of an epoxide resin which comprises reacting a hydroxyl-group-containing epoxide resin with a compound of the formula:

$$R^1-(O)_m-C(R)(OR^2)(OR^3)$$

wherein R denotes hydrogen, or an alkyl, alkenyl, cycloalkyl, cycloalkenyl or aryl group, $R^1$, $R^2$, and $R^3$ each denote an alkyl or alkenyl group, at least one of $R^2$ and $R^3$ containing not more than five carbon atoms, and $m$ is zero or 1.

Also within the scope of the present invention are hardenable compositions containing an epoxide resin treated according to the aforesaid new process and a curing agent therefor, and hardened compositions obtained from such compositions.

Preferred compounds of Formula I are those in which R denotes hydrogen, $m$ is 1, and $R^1$, $R^2$ and $R^3$ are the same or different alkyl or alkenyl groups each containing not more than five carbon atoms. These compounds are orthoformates, and the particularly preferred such orthoformates are those wherein $R^1$, $R^2$ and $R^3$ are the same and are each an alkyl group containing not more than five carbon atoms, e.g. trimethyl orthoformate or triethyl orthoformate.

Other preferred compounds of Formula I are those in which R denotes hydrogen, $m$ is zero, and $R^1$, $R^2$ and $R^3$ are the same or different alkyl or alkenyl groups each containing not more than five carbon atoms. These compounds are acetals, and the particularly preferred such acetals are those wherein $R^2$ and $R^3$ are the same and are each an alkyl group containing not more than five carbon atoms, e.g. diethyl acetal, di-n-propyl acetal, propionaldehyde diethyl acetal and acrolein diethyl acetal.

Still other preferred compounds of Formula I are those in which R denotes an alkyl, alkenyl or phenyl group, $m$ is zero, and $R^1$, $R^2$ and $R^3$ are the same or different alkyl or alkenyl groups each containing not more than five carbon atoms. These compounds are ketals, and the particularly preferred such ketals are those wherein $R^2$ and $R^3$ are the same and are each an alkyl group containing not more than five carbon atoms, e.g. 2,2-dimethoxypropane and 2,2-diethoxypropane.

Reaction between the hydroxyl group-containing epoxide resin and the compound of Formula I is effected by heating the two together. A small amount of an acidic catalyst, such as hydrogen chloride, may be added. However, when the compound of Formula I is an orthoformate ester, such addition is usually unnecessary.

The amount of compound of the Formula I employed is suitably at least enough to react with all the hydroxyl groups of the epoxide resin, and preferably a comparatively large excess is employed to facilitate completion of the reaction. Generally speaking a compound of Formula I which is more volatile than the epoxide resin to be treated is employed, so that any unreacted excess of the compound of Formula I may be distilled from the treated epoxide resin, and then reused if desired. The preferred compounds of Formula I mentioned above are, in general, liquids of low viscosity, so that an excess can be used as diluent for the resin treated. However, an inert solvent, such as toluene or xylene, may, if desired, be added to the reaction mixture.

Epoxide resins containing hydroxyl groups which may be treated by the new process include, for example, polyglycidal esters obtainable by the reaction of a di- or polycarboxylic acid with epichlorohydrin or glycerol dichlorohydrin in the presence of an alkali. Such polyglycidyl esters may be derived from aliphatic dicarboxylic acids, e.g. oxalic acid, succinic acid, glutaric acid, adipic acid, pimelic acid, suberic acid, azelaic acid, sebacic acid, or dimerised or trimerised linoleic acid, or from aromatic dicarboxylic acids such as phthalic acid, isophthalic acid, terephthalic acid, naphthalene-2,6-dicarboxylic acid, diphenyl-2,2'-dicarboxylic acid and ethylene glycol bis(4-carboxyphenyl ether). Specific such polyglycidyl esters are, for example, diglycidyl adipate and those diglycidyl esters which correspond to the average formula:

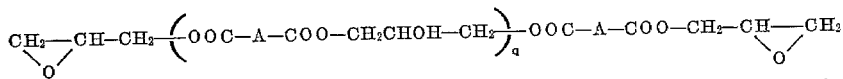

in which A represents a divalent aromatic hydrocarbon radical, such as a phenylene group, and $q$ represents a small positive whole or fractional number. Further examples of epoxide resins which may be treated by the process of this invention are the polyglycidyl ethers obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-aryldialkanolamines such as N-phenyldiethanolamine, and are preferably derived from dihydric or polyhydric phenols such as resorcinol, catechol, hydroquinone, 1,4-dihydroxynaphthalene, 1,5-dihydroxynaphthalene, bis(4-hydroxyphenyl) methane, bis(4 - hydroxyphenyl)methylphenylmethane, bis(4 - hydroxyphenyl)tolylmethane, 4,4' - dihydroxydiphenyl, bis(4-hydroxyphenyl) sulphone and, especially, 2,2-bis(4-hydroxyphenyl) propane or phenol-formaldehyde condensation products.

Aminopolyepoxides may similarly be employed such as are, for example, obtained by the dehydrohalogenation of the reaction products of epihalohydrins and primary or disecondary amines such as aniline, n-butylamine, bis(4-aminophenyl)methane, or bis(4 - methylaminophenyl) methane, and epoxide resins obtained by the epoxidation of cyclic and acyclic polyolefins, such as vinylcyclohexene dioxide, limonene dioxide, dicyclopentadiene dioxide, 3,4-epoxydihydrodicyclopentadienyl glycidyl ether, the bis (3,4-epoxydihydrodicyclopentadienyl) ether of ethylene glycol, 3,4-epoxycyclohexylmethyl 3',4'-epoxycyclohexanecarboxylate and its 6,6'-dimethyl derivative, the bis (3,4-epoxycyclohexanecarboxylate) of ethylene glycol, the cyclic acetal formed between 3,4-epoxycyclohexanecarboxyaldehyde and 1,1-bis(hydroxymethyl)-3,4-epoxycyclohexane, and epoxidised butadienes or copolymers of butadiene with ethylenic compounds such as styrene and vinyl acetate.

Examples of curing agents which may be used in the compositions of the invention include those conventionally employed as cross-linking agents for epoxide resins, for example, amines such as butylamine, p-phenylenediamine, bis(p-aminophenyl)methane, ethylenediamine, N, N'-diethylethylenediamine, diethylenetriamine, N-hydroxyethyldiethylenetriamine, triethylenetetramine, tetraethylenepentamine, guanidine derivatives, such as phenylguanidine and diphenylguanidine, dicyandiamide, aniline-formaldehyde resins, polymers of aminostyrenes, and polyaminoamides, e.g. those prepared from aliphatic polyamines and dimerised or trimerised unsaturated fatty acids; isocyanates and isothiocyanates; polyhydric phenols, e.g. resorcinol, hydroquinone, 2,2-bis(4-hydroxyphenyl) propane, phenol-aldehyde resins and oil-modified phenol-aldehyde resins, reaction products of aluminium alkoxides or phenolates with tautomeric-reacting compounds of the acetoacetic ester type; Friedel-Crafts catalysts, e.g. $AlCl_3$, $ZnCl_2$, and $BF_3$, and their complexes with organic compounds; phosphoric acid; and polycarboxylic acids and their anhydrides, e.g. phthalic anhydride, methylendomethylenetetrahydrophthalic anhydrides, dodecenylsuccinic anhydride, hexahydrophthalic anhydride, hexachloroendomethylenetetrahydrophthalic anhydrides and endomethylenetetrahydrophthalic anhydride and their mixtures, pyromellitic dianhydride, and maleic and succinic anhydrides.

Catalytic hardeners may also be used, e.g. tertiary amines such as 2,4,6-tris(dimethylaminomethyl)phenol, triethanolamine, and N-benzyldimethylamine; alkali metal alkoxides of alcohols such as 2,4-dihydroxy-3-hydroxymethylpentane; stannous salts of alkanoic acids, such as stannous octoate; aluminium alkoxides, and triphenylphosphine.

The compositions of the present invention may also contain reactive diluents such as phenyl glycidyl ether. If desired, hydroxyl group-containing materials may be added to the modified resins in proportions such that there are obtained resins having reactivities intermediate between that of the unmodified resin and that of the modified resin substantially free from hydroxyl groups. They may also contain fillers, plasticisers, and colouring agents, for example, asphalt, bitumen, glass fibres, mica, quartz powder, cellulose, kaolin, finely-divided silica (such as that available under the registered trademark "A Rosil"), or metal powder. The aforesaid compositions may be used as dipping, casting, potting, encapsulating, coating or adhesive resins.

The following examples illustrate the invention. Epoxide contents were determined by modification of the procedure described by Jay (Analytical Chemistry, 1964, 36, 667–8), the tetraethylammonium bromide being added as a solid instead of dissolved in glacial acetic acid, since the solution is not stable on storage.

Example I

The epoxide resin employed, hereinafter called "Epoxide resin I," was prepared in a conventional manner by the reaction of bisphenol A with epichlorohydrin in the presence of sodium hydroxide, and had the following characteristics: epoxide content, 5.23 equiv./kg.; chlorohydrin content, as determined by titration with methanolic sodium methoxide, 0.2 equiv./kg.; hydroxyl-group content, as estimated from the infra-red spectrum, greater than 0.3 equiv./kg.; viscosity at 21° C., 235 poises.

A mixture of Epoxide resin I (50 g.) and triethyl orthoformate (75 ml.) was heated in a flask fitted with a Fenske fractionating column, 30.5 cm. long, and a partial return head. The ethanol evolved was slowly distilled off, and heating continued until the temperature of the refluxing liquid at the top of the column remained steady at the boiling point of triethyl orthoformate, i.e. 146° C. The residue was cooled, and then slowly heated to 140° C. at a pressure of 0.7 mm. to remove excess triethyl orthoformate. There remained a resin having the following characteristics: epoxide content, 4.98 equiv./kg.; chlorohydrin content, 0.01 equiv./kg.; estimated hydroxyl-group content, less than 0.05 equiv./kg.; viscosity at 21° C., 150 poises. The decrease in epoxide content can be attributed to the increase in molecular weight caused by introduction of the bis(ethoxy) methyl group.

Example II

The hydroxyl group-containing epoxide resin used, hereinafter called "Epoxide resin II," was prepared in a manner similar to that used for Epoxide resin I, and had an epoxide content of 5.34 equiv./kg. Epoxide resin II (50 g.), di-n-propyl acetal (200 ml.) and 2 ml. of a saturated solution of hydrogen chloride in di-n-propyl acetal were heated together as described in Example I. When the temperature of the liquid at the top of the column remained steady at 146° C., the residue was cooled and then heated to 100° C. in a rotary evaporator under 0.7 mm. pressure. The resin remaining had, as indicated by its infra-red spectrum, a substantially reduced content of hydroxyl groups. The epoxide content was 5.00 equiv./kg.

Example III

A mixture of Epoxide resin II (25 g.), acrolein diethyl acetal (35 ml.), toluene (48 ml.) and 2 ml. of a saturated solution of hydrogen chloride in toluene was heated as described in Example I. The temperature of the liquid refluxing at the top of the column rose slowly to 110° C. After the temperature had remained at this level for 1 hour, the mixture was heated to 100° C. under 0.7 mm. pressure to remove volatile materials. The infra-red spectrum of the resin remaining showed that the hydroxyl group content had been substantially reduced.

Example IV

A mixture of Epoxide resin II (100 g.), 2,2-dimethoxypropane (30 ml.), benzene (200 ml.) and 2 ml. of a saturated solution of hydrogen chloride in benzene was heated as described in Example 1. The temperature of the liquid refluxing at the top of the column slowly rose to 78° C. After heating for a further two hours, the mixture was cooled, and then heated to 100° C. under 0.7 mm. pressure. The resin remaining had, as shown by its infra-red spectrum, a reduced content of hydroxyl groups.

Example V

For purposes of comparison there was used a carefully-purified fraction of a polyglycidyl ether of bisphenol A, hereinafter designated "Epoxide resin III." It had an epoxide content, as determined by titration with hydrogen bromide in glacial acetic acid, of 5.78 equiv./kg. (the calculated content for bisphenol A diglycidyl ether is 5.88 equiv./kg.); a chlorohydrin content, as determined by titration with methanolic sodium methoxide, of 0.03 equiv./kg., and a hydroxyl group content, as estimated from its infra-red spectrum, of less than 0.05 equiv./kg. At room temperature, it consisted of moist crystals.

Three mixtures were prepared comprising, respectively, 100 parts of the modified epoxide resin prepared as described in Example I with 26 parts of 4,4'-diaminodiphenylmethane, 100 parts of the unmodified epoxide resin used in Example I with 27 parts of 4,4'-diaminodiphenylmethane, and 100 parts of the unmodified Epoxide resin III with 30 parts of 4,4'-diaminodiphenylmethane, (the higher proportions of curing agent corresponding to the higher epoxide contents of the unmodified resins). The temperatures of 100 g. samples of the mixtures, heated to 70° C. and placed in vacuum-jacketed flasks, rose to respective maxima of 198° C. (after 114 minutes), 224° C. (after 40 minutes), and 230° C. (after 65 minutes). Samples of these mixtures, after curing for 3 hours at 80° C. followed by 4½ hours at 140° C. had respective deflection temperatures under load (measured according to ASTM Specification D648–56) of 130° C., 156° C. and 154° C.

We claim:

1. A process for lowering the hydroxyl group content of an epoxy resin containing on average more than one 1,2-epoxide group per molecule which comprises reacting at an elevated temperature a hydroxyl group-containing epoxy resin with a compound of the formula

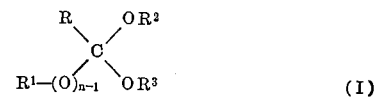

(I)

wherein R is a member selected from the group consisting of hydrogen atom, alkyl, alkenyl, cycloalkyl, cycloalkenyl and aryl group, $R^1$, $R^2$, and $R^3$ each are members selected from the group consisting of alkyl and alkenyl group, with proviso that at least one of $R^2$ and $R^3$ contains not more than five carbon atoms, and $n$ is an integer of at least 1 and at most 2.

2. A process according to claim 1, wherein the compound of Formula I is a member selected from the group consisting of trimethyl orthoformate and triethyl orthoformate.

3. A process according to claim 1, wherein the compound of Formula I is a member selected from the group consisting of diethyl acetal, di-n-propyl acetal, propionaldehyde diethyl acetal and acrolein diethyl acetal.

4. A process according to claim 1, wherein the compound of Formula I is a member selected from the group consisting of 2,2-dimethoxypropane and 2,2-diethoxypropane.

5. A process according to claim 1, wherein the reaction is carried out in the presence of a small amount of an acidic catalyst.

6. A process according to claim 5, wherein the acidic catalyst is hydrogen chloride.

7. A process according to claim 1, wherein the compound of Formula I is more volatile than the epoxy resin and is employed in an amount in excess of the stoichiometric amount required to react with all the hydroxyl groups of the epoxy resin and the excess of said compound of Formula I is distilled from the treated epoxy resin after completion of the reaction.

References Cited
UNITED STATES PATENTS

| | | | |
|---|---|---|---|
| 3,158,590 | 11/1964 | Phillips et al. | 260—78.4 |
| 3,086,025 | 4/1963 | Tinsley et al. | 260—340.9 |

WILLIAM H. SHORT, Primary Examiner

E. NIELSEN, Assistant Examiner

U.S. Cl. X.R.

260—2, 51, 75